July 7, 1959

H. S. FORTNER 2,893,467

TIRE BUILDING APPARATUS

Filed April 16, 1956

INVENTOR
HERMAN S. FORTNER
BY
Steward & Steward
his ATTORNEYS

United States Patent Office 2,893,467
Patented July 7, 1959

2,893,467

TIRE BUILDING APPARATUS

Herman S. Fortner, South Norwalk, Conn., assignor to The Armstrong Rubber Company, West Haven, Conn., a corporation of Connecticut Application April 16, 1956, Serial No. 578,338

4 Claims. (Cl. 154—9)

This invention relates to apparatus for building tires and it relates more particularly to a device for mounting endless bands of elastic material on tire building drums in the manufacture of pneumatic tires.

In the manufacture of tire casings for large size tires which may be used, for instance, on trucks, tractors, construction equipment and the like, it is usually the practice to first make up endless bands of rubberized tire fabric of two or more plies and of somewhat smaller diameter than the outside diameter of the tire building drum or core. These bands are then either "spun" by hand on to the drum or stretched by machine in one way or another to apply them to the drum. In building tire casings in this manner, several bands are ordinarily applied to the drum one on top of the other, each band being "stitched" to the ones underneath and the bead formed by overlapping the outer edges of the bands around a wire ring, all as is well known in the art.

One of the most common ways of applying such bands to the drum is for the tire builder or operator to carry the band, draped over his outstretched arms extending inside the band, from a rack near the tire building machine to the free end of the drum where he puts the upper edge of the band over the edge of the drum and stretches the edge of the band onto the drum. In the case of the first band to be placed on the drum which may be collapsed, the band may not have to be stretched initially and the operator is able conveniently to place the leading edge of the band about halfway or more across the building drum before expanding it. However, after the first band is applied, the drum is of course already expanded, and the next band must be stretched in order to get it started onto the edge of the drum. It is, therefore, virtually impossible to drag the second and succeeding bands across the drum due to the tight fit of the band on the drum and to the tackiness of the unvulcanized rubber impregnated bands which tend to stick to each other. Once the band is started on the drum in either of the above-mentioned cases, the drum and the thus partially applied band are rotated at a relatively high speed in order to make the free end or overhang of the band flare open by centrifugal force. The tire builder then takes a long handled tool, known as a spinner bar, and presses downwardly on the lower inside surface of the rotating band next to the edge of the drum. By holding the spinner bar at the correct angle and exerting the proper force, the band is stretched somewhat at this point and is drawn onto the drum by rotation of the drum itself until it is properly centered thereon.

Spinning a band onto a tire-building drum by hand in this manner requires great skill, and the operator, moreover, must be a man of considerable strength and agility. It is also an extremely hazardous operation under certain circumstances because, if for any reason the spinner bar should become caught, either in the band or between the band and the drum, it may be wrenched from the operator's hands and thrown against him with great force due to the high speed at which the drum and band are rotated. This can and has caused serious injury to the operator who is in a bent-over position while he spins the band onto the drum so that his head and shoulders are close to, and may even be almost inside, the open end of the spinning band. The larger and wider the tire is, the more difficult and dangerous it becomes of course to apply the bands to the drums. In the case of bands which are much wider than the length of a man's arm, for instance, it is very difficult for the tire builder to get his arms completely inside the band to start it on over the edge of the drum without badly wrinkling the band, especially when the stock is quite tacky. Also, the weight of the wide overhang of the band beyond the end of the drum frequently causes it to collapse easily after the drum is started rotating and when the band is spun on the drum. As a result, tire builders have a justifiable fear of spinning on bands of this kind and, in order to protect themselves, they work the bands across the drum as far as possible by pulling on the edge of the band at successive intervals around the circumference thereof, to reduce the amount of overhang. This causes loss of much valuable time and, moreover, is likely to result in an inferior product.

In addition, it has become increasingly important to use bands of three and four plies of fabric. Because the three and four-ply bands are much heavier and stiffer than two-ply bands, they are much more difficult for a tire builder to handle, both in starting the band on the drum and in spinning it on with the hand-held spinner bar.

Various types of machines have been developed to try to eliminate this hand operation. In many such machines, the band is stretched to a diameter greater than that of the drum, moved into position surrounding the drum and then permitted to contract onto the drum. Such machines are necessarily complicated and highly expensive. Other apparatus has been developed whereby a relatively thin rotatable rod is extended across the outer periphery of the drum so that one edge of the band may be stretched over both the drum and the rod and then drawn onto the drum as the latter is rotated causing the band to rotate also. Apparatus of this type is shown for example in the patents to Denmire 1,648,842 and Bruber 2,393,506. Such apparatus has the disadvantage that the fabric bands must be stretched more than they are when they are spun on by hand, the thus increased stretching being undesirable from a quality standpoint. Moreover, since the band applying rod extends across the outer surface of the drum with the band encompassing both the drum and the rod, it is necessary to withdraw the rod from between the drum and the band after the band is centered on the drum. This is difficult to do without wrinkling the band, which is of course tacky and tends to adhere to the rod, particularly when it is attempted to move the rod endwise from beneath the band that is stretched tautly over it.

From the foregoing it will be readily apparent that both the method of hand spinning the bands on the drum and the use of existing band applying machines have serious disadvantages. It is, therefore, a primary object of this invention to overcome these disadvantages and to provide a simple, relatively inexpensive apparatus for quickly and efficiently applying endless bands to tire building drums.

Another object of the invention is to provide a band applier which is capable of spinning the band onto the drum in a manner similar to the way in which the band has heretofore been spun on by hand but which saves a large amount of time and eliminates most of the danger to the tire builder or operator.

These and other objects of the invention, as well as its novel features and advantages, will become further apparent from the description hereinafter, Apparatus embodying the invention in its most advantageous form comprises a single, relatively large diameter, band supporting and applying roller mounted generally horizontally on a movable frame. The roller may be moved into end-to-end band applying position relative to the tire building drum so that the outer edge of an endless band previously placed on the roller may be readily transferred onto the drum. The band applying roller is preferably set at a slight angle to the axis of rotation of the drum whereby upon rotation of the drum, the band is rotated and is drawn or spun onto the drum. An essential feature of the invention is that, while the band is being spun onto the drum, the band applying roller is in end-to-end relation with the drum. It is desirable, moreover, that the roller be of relatively large diameter, on the order of about a third as large as the diameter of the drum. Although rollers varying widely in diameter can be made to work, if the roller is too small, there is insufficient friction between the band and the roller to operate properly and, on the other hand, if the roller is too large, it is excessively heavy and builds up too much momentum while the band is being spun on. In order to obtain the best results, it is also desirable to position the outer side of the periphery of the band applying roller a few inches outwardly radially of the outer surface of the drum. This causes the band to be stretched slightly at this point.

One of the greatest advantages of apparatus according to this invention is the large amount of time and therefore expense which it saves in building tires, especially those which are too large to be handled by hand. It is, however, also advantageous even in connection with some smaller size tires because, for one thing, it is safer to apply bands using this apparatus than it is to spin them on by hand.

An apparatus embodying the invention in its most advantageous form is illustrated in the accompanying drawings, in which—

Figure 1:
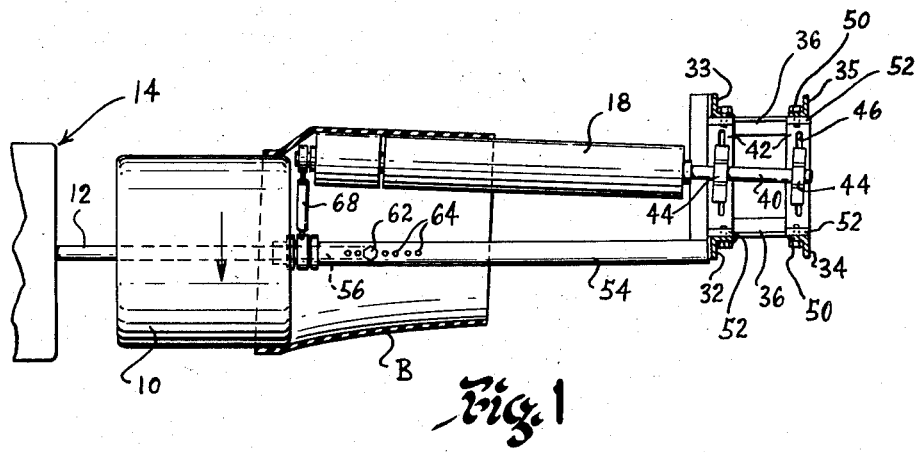
Fig. 1 is a plan view of the apparatus with the band applying roller in position to spin a band onto the tire building drum.

Referring to the drawings, a conventional tire building drum 10, preferably of the collapsible type, is shown mounted on one end of a driving spindle 12 for rotation therewith. The other end of the spindle 12 is journaled within the housing for the drum driving mechanism, generally indicated at 14, and is driven by some means, such as an electric motor (not shown). Bead-setting devices, fabric stitchers, tread stitchers, stock racks, and other apparatus used in connection with tire building machines are not shown in the drawings as these form no part of the invention.

The band applier is carried by a movable frame 16 (Fig. 2), and comprises a band supporting and applying roller 18 disposed in a generally horizontal position adjacent the free end of drum 10. In the construction shown in the drawings, frame 16 is suspended from the ceiling for movement both longitudinally and transversely of the band applying roller 18. A pair of overhead tracks 20 running transversely of roller 18 are rigidly mounted on the ceiling, and a pair of cross members 22 extending parallel to tracks 20 are carried by conveyor trolleys 24, which roll in tracks 20. A second pair of tracks 26 running at right angles to tracks 20 are fixed, as by welding, to the lower sides of cross members 22. A rectangular overhead structure 28 is suspended from and movable along tracks 26 by means of conveyor trolleys 30 which are mounted on the overhead structure 28 and roll in tracks 26. It may be readily seen, therefore, that the structure 28, and consequently frame 16 as a whole, are movable transversely of roller 18 along tracks 20 and longitudinally thereof along tracks 26. This permits the band applier to be moved toward and away from the drum 10 axially thereof when successive bands are intermittently applied onto the drum. Moreover, the applier can be moved laterally in order to get it completely out of the way when it is not needed.

Figure 2:
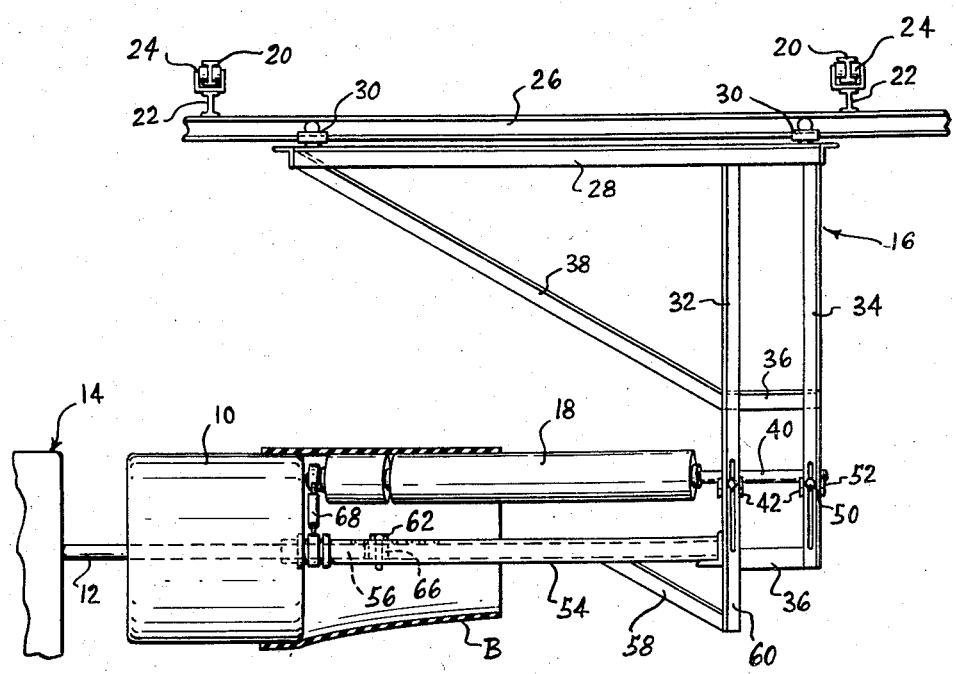
Fig. 2 is a side elevation of the same.

At the rear end, i.e. to the right in Fig. 2, of overhead structure 28, four vertical posts 32—35 extend down to the level of the tire building drum 10 to support the rear end of roller 18. Posts 32—35 are welded at their upper ends to the structure 28 and are braced at their lower ends and intermediate their ends by means of crossbars 36, 37. Diagonal braces 38, extending downwardly from the forward end of the overhead structure 28 and secured to the front vertical posts 32, 33 adjacent the intermediate crossbars 36, 37, support the lower ends of posts 32—35 against the weight of roller 18 which extends in cantilever fashion forwardly from frame 16.

Roller 18 is journaled on a shaft 40, which in this instance is stationary and is mounted at its rear end directly on frame 16. Shaft 40 is angularly adjustable so that the axis of roller 18 may be inclined at any desired angle to the axis of the tire building drum 10. Moreover, shaft 40 is adjustable laterally, both vertically and horizontally, in order to vary the position of roller 18 laterally with respect to drum 10. To this end, horizontal brackets 42 are adjustably secured on frame 16 between vertical posts 32, 33, and 34, 35, respectively, and roller shaft mounting blocks 44 are bolted to brackets 42. Blocks 44 may be adjusted horizontally along slots 46 cut in brackets 42 and are also capable of pivoting slightly in order to permit shaft 40 to be set at an angle. In the arrangement shown in Fig. 3, this is accomplished by means of a single central threaded mounting stud 48 on block 44 extending down through the slot 46 in bracket 42 and to which is threaded a nut fitting on the underside of the bracket.

As shown, shaft 40 is rigidly fixed in mounting blocks 44, the roller 18 being freely rotatable on shaft 40 as mentioned above. If desired, however, shaft 40 may be rotatably mounted in bearings which may be substituted for mounting blocks 44. In that case, roller 18 would be fixed to shaft 40.

In order to provide for vertical adjustment of the band applying roller 18, vertical posts 32—35 are vertically slotted, as shown in Fig. 2, adjacent the horizontal brackets 42. Bolts 50 pass through the slots and threadedly engage upstanding ears 52 at each end of brackets 42. While in Fig. 2 roller 18 is shown as extending horizontally, it is sometimes desirable to tilt it with respect to a horizontal plane as well as to a vertical plane. This can be readily done by merely lowering the rearmost mounting block 44 and bracket 42 on which it is mounted, or by raising the other bracket and mounting block. In so doing, brackets 42 will pivot slightly on their mounting bolts 50 to permit tilting of shaft 40.

The band applying roller 18 is in the present instance cylindrical throughout and has been found to function most satisfactorily when it is divided into two sections, both freely rotatable on shaft 40. The roller may, however, be one long section or, for that matter, it may be made up of any number of sections. Where it is mentioned herein and in the claims appended hereto that the apparatus is provided with a single roller, this is to be construed to mean a roller on a single shaft having a single axis of rotation and is intended to include a roller which may have any number of separate sections. The reason for separating the roller into the short forward section and the long rear section as shown in the drawings, is that it has been found that a one section roller picks up too much momentum as the band B (Figs. 1 and 2) is being spun onto the drum. This would not be objectionable if it were not for the fact that it is sometimes necessary to stop rotation of the drum suddenly while a band is being spun on. When this happens while some of the band is still on the roller, the roller is stopped by the band, sometimes causing the band to twist and wrinkle. However, by providing the short section of the roller on the front end, the weight of that section is very much less than that of the whole roller, and the objectionable twisting effect noted above is overcome. It should be mentioned that due to the angle at which the roller is set with respect to the drum and to the fact that the periphery of the roller extends outwardly of the periphery of the drum, almost all the frictional contact between the band and the roller is on this short forward section. Therefore, even if the drum has to be stopped suddenly before the band has left the long rear section of the roller, the band does not tend to twist due to the slippage between it and the heavy rear portion of the roller.

A typical band applying roller embodying the invention as shown in the drawings may be about 6 feet long overall, the shoft forward end section of which is about 1½ feet in length.

It is highly desirable that the band applying roller 18 be of relatively large diameter in order to provide as much area of contact as possible between the band and the roller so that enough friction can be obtained between them without unduly increasing the amount of stretch of the band by adjustment of the roller outwardly beyond the outer surface of the drum. It has been found that in building tires having 20 to 24 inch bead diameters, wherein the tire building drum is on the order of 2 to 2½ feet in diameter, a band applying roller of 10 inch diameter, made of aluminum to reduce its weight, works very satisfactorily. Rollers of half this diameter or even less can be used to spin bands onto the drum but they have not been found to provide as consistently good results as the ten inch roller. On the other hand, larger diameter rollers may also be used but, if the roller is too large in diameter, weight and expense become limiting factors.

Figure 3:
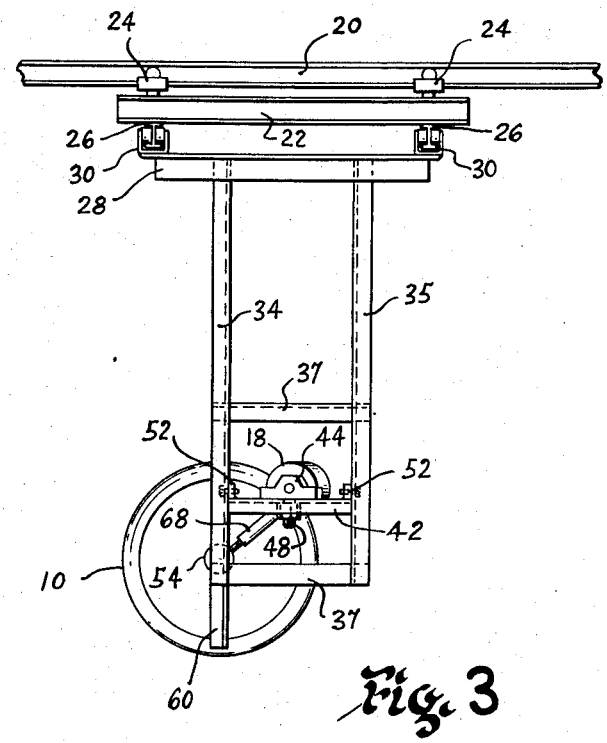
Fig. 3 is an end elevation, looking at the right-hand end of the apparatus as illustrated in Figs. 1 and 2.
Figure 4:
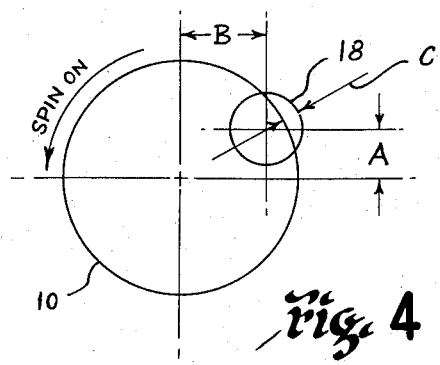
Fig. 4 is a diagram showing the preferred position of the end of the applying roller with respect to the drum.

Another important factor which must be taken into consideration in order to obtain the best results is the angle of the band applying roller with respect to the tire building drum. In Figs. 1 and 2 the roller is shown lying in a horizontal plane and offset to one side. However, as has already been mentioned hereinabove, the roller may be inclined with respect to the horizontal as well as the vertical or only with respect to the horizontal. It is believed, moreover, that it is possible to spin a band onto a tire building drum with the axis of the roller parallel with the axis of the drum, so long as a portion of the surface of the roller extends out beyond the surface of the drum. The pitch of the roller will vary depending on the particular tire being built. For truck tires such as the sizes designated as 8.25 x 20 to 11.00 x 24 for instance, the pitch of the roller should be on the order of ¾ inch, plus or minus ¼ inch, for each 48 inches in length of the roller. It will be appreciated, however, that for any particular size of tire and construction, the applier may be adjusted to whatever angle is found to work best, the angular adjustment of the roller being readily made by means of the shaft mounting means on the frame 16. Once the particular pitch and position of the roller, which prove to be satisfactory in any specific instance, have been determined, the adjusting bolts are brought up tight in order to hold the roller in that position.

Where the tire-building drum 10 is rotated in the direction indicated by the arrow in Figs. 1 and 4 in order to spin on the band, the front end of the roller 18 should be located along the upper right hand quadrant of the circumference of the drum when viewed from the free end thereof, as shown in Figs. 3 and 4. It should, moreover, be located such that a portion of the periphery of roller 18 is outside the periphery of drum 10, as best illustrated in the diagram of Fig. 4 where the large circle indicates the periphery of the tire building drum and the small circle overlapping the large one is the end of roller 18 adjacent the drum 10. The dimensions A and B in this diagram locate the center of roller 18 at its extreme forward end with respect to the axis of drum 10. The dimension C is the distance by which the periphery of roller 18 extends outwardly of the periphery of drum 10. The following table gives illustrative examples of the location of the band applying roller relative to the drum, which have been found to be satisfactory for some specific truck tires.

| Tire Size | Ply Rating | Drum Diam., inches | Roller Diam., inches | Dimen. A, inches | Dimen. B, inches | Dimen. C, inches |
|---|---|---|---|---|---|---|
| 8.25 x 20 | 10 | 25 | 10 | 6 | 8¾ | 3.1 |
| 8.25 x 20 | 12 | 25 | 10 | 5½ | 9 | 3 |
| 10.00 x 20 | 12 | 25.82 | 10 | 6¾ | 8½ | 3 |
| 10.00 x 22 | 12 | 27.28 | 10 | 7¾ | 8½ | 2.9 |
| 10.00 x 20 | 14 | 25.82 | 10 | 7⅜ | 9 | 3.7 |

The band applier may be used in connection with considerably larger tires than those noted above and, where such tires have larger bead diameters, they are of course built on drums of larger diameter. For instance, it is possible to use the applier on an 18.00 x 25 tire built on a 36" diameter drum and using bands which are as much as 72 inches or more wide. The diameter of the band applying roller, nevertheless, may be the same as that used on the smaller sizes or, if desired and practical, it may be proportionately larger.

The diameters and widths of the bands which are used in building truck tires of the sizes given in the foregoing table vary depending not only on the tire size, but also on the number of bands used and on the number of plies in the carcass for a particular ply rating, the actual number of plies depending on the kind of fabric used. For instance, in the 8.25 size truck tires, the width of the bands used ranges from 26¼ inches to 34⅜ inches. In the 10.00 size tire, the bands are from 30⅓ inches to 40⅜ inches in width. For the larger size truck tires, such as 11.00 x 24 which is built on a 30 inch drum, the width of the bands range from 32⅜ inches to 43⅜ inches.

The diameters of the bands also vary depending on the size of the drum on which the tire is built, the number of bands used, and the amount which it is desired each band be stretched when on the drum or tire carcass. In the particular truck tires referred to above, it has been found desirable to use a 9% stretch. This means that the diameter of the first band applied to the tire building drum is 9% less than the diameter of the drum and that the diameter of each succeeding band is 9% less than the diameter of the drum plus twice the thickness of the bands already applied. Consequently, each band is stretched the same proportionate amount when on the drum. This is standard practice in building tires, but must be taken into consideration in determining the correct placement of the band applying roller with respect to the building drum, so that all the bands, which usually number four or five for each tire, will be properly spun on by the applier for any particular tire specification. The 9% stretch for the bands used in connection with the truck tires noted was chosen in order to provide enough friction between the band and the roller so that the band will spin on properly. Greater or less stretch can of course be used depending on circumstances.

As shown in Figs. 1 and 3, the positioning of the roller with respect to the drum is shown somewhat exaggerated for illustrative purposes. However, the amount which a portion of the roller 18 extends outwardly of the surface of the tire building drum, in other words the dimension C (Fig. 4), is important because if this dimension is not great enough, the last band to be applied on a 10- or 12-ply tire casing, for instance, may not spin on properly. On the other hand, if the dimension C is too great, the first band which is applied is stretched too much beyond its final position in the tire. Consequently, the exact positioning of the roller must be finally adjusted for each particular type and size of tire to be built. In building truck tires of ordinary sizes, the dimension C designated in Fig. 4 should be on the order of 3 inches, plus or minus ¾ inch. Once the band applier is set up for proper operation for a particular tire, it may be used indefinitely without further adjustment on the same job so long as it does not get out of adjustment.

In order to ensure that the roller 18 is accurately positioned relative to drum 10 each time a band is applied, the frame 16 is guided axially of the drum, when the roller is moved into band applying position, by means of a guide member 54 which is engageable with the pilot shaft 56 of drum 10 extending outwardly from the center thereof. As shown, pilot shaft 56 may be simply an extension of pinion 12. In the present instance, guide member 54 is a hollow cylindrical shaft or length of pipe rigidly secured at one end to the lower end of vertical post 32 of frame 16. A diagonal brace 58, immovably fastened to guide member 54 about a quarter of its length from the rear end thereof, extends down and is welded to an extension 60 at the bottom of vertical post 32. The open forward end of guide member 54 has an inside diameter which is just large enough to fit snugly over the end of pilot shaft 56 in order to prevent lateral movement of the roller 18 while a band is being applied.

A stop pin 62 fits through holes 64 drilled at spaced intervals along guide member 54 adjacent the forward end thereof, in order to limit axial movement of the band applier toward the tire building drum 10. A bearing block 66, through which pin 62 fits, is provided within the guide member 54. The tip of pilot shaft 56 bears against block 66 which is made of any suitable, preferably self-lubricating, bearing material. The distance which the end of roller 18 may come to the edge of drum 10 is adjusted by simply removing stop pin 62 and moving bearing block 66 axially to the desired position, and then reinserting pin 62 in the nearest pair of holes 64 through block 66.

The end of the roller should be as close to the drum 10 as possible without rubbing the surface of a previously applied band, the edges of which have been tucked inwardly under the edge of the drum by stitching in the usual manner. While a band B is being spun onto the drum, the band applier is drawn toward the drum by the pull of the band which in turn is being drawn by rotation of the drum. Consequently, the roller 18 is fixed in position during the spinning operation because it is held axially by abutment of pilot shaft 56 with bearing block 66, against which the applier is drawn by the band. Furthermore, as described hereinbefore, roller 18 cannot move laterally due to engagement of pilot shaft 56 within the end of guide member 54.

In the specific apparatus shown in the drawings for illustrative purposes, the forward end of roller 18 is supported by means of an adjustable brace 68, in the form of a turnbuckle, which is fastened at one end to the forward end of guide member 54 and at its other end to the forward end of shaft 40 on which roller 18 is journaled. Turnbuckle 68 is provided with suitable lock nuts (not shown) for locking it in position when properly adjusted. While it is not always necessary to support the spinning roller 18 at its forward end, it has been found that in using it for a long period of time to apply heavy three or four ply bands, the shaft may become bent. Moreover, due to the high speed at which such heavy bands must be spun on, the applier is very likely to vibrate unless it is supported at both ends as shown in the drawings. Furthermore, in order to reduce vibration, the roller should be statically balanced. However, even when this is done it is advisable in using the applier for building large tires for earth moving equipment, for instance, to support the forward end of the roller. On the other hand, this is not essential in all instances, and the roller can, if desired, be supported only at the rear.

The band applier is normally moved to one side of the tire building machine where it is out of the way and where a band may be placed on it for eventual application on the building drum. When the operator is ready to apply the band, he moves the applier into position, guiding the guide member 54 over the end of the pilot shaft 56 on the drum 10. In the apparatus shown, the applier is moved manually to and from the tire building machine. However, this can be done mechanically, if desired, by providing suitable power means controlled by the tire builder. When the roller 18 is in band-applying position and has been previously adjusted relative to drum 10 so that it will spin the bands properly, the band is drawn by hand axially of the roller onto the drum. As already mentioned hereinbefore, the first band may be started on a collapsed drum and is usually drawn about halfway across the drum before the drum is expanded to its full diameter. The drum is then started rotating at a speed of about 250 r.p.m. or more in order to spin the band the rest of the way onto the drum. In order to center the band on the drum, a center-indicating arm (not shown) is suspended above the drum and may be moved close to the surface thereof so that when a center mark, which has been previously placed on the band, comes into alignment with the center indicator on the tire building machine, rotation of the drum is stopped immediately to prevent spinning the band too far onto the drum. If for any reason the band happens to travel beyond the center mark, it is sometimes possible to adjust its position back to the center by reversing the direction of rotation of the drum and backing the band off slightly. However, because of the tendency of the band to contract and to adhere to the drum, or more particularly to the tire carcass where the band being applied is not the first one, and especially where conditions make the bands more tacky, it is difficult to adjust the band once the drum has been stopped. It is important therefore to try to avoid such adjustment by stopping the band substantially on center.

When the first band is centered on the drum, only a short length of the band remains on the end of the applier roller. Due to the fact that the roller 18 does not extend across the periphery of drum 10 and only stretches the band a relatively small amount at one point in its circumference, the applier can be readily moved back away from the drum wihtout damaging the band which has just been applied. The band on the tire building drum is then stitched in the usual way while another band is placed on the band applier for the next band-applying operation.

The next and all succeeding bands are started on the drum by stretching the edge of the band by hand over the edge of the drum a distance of 2½ to 5 inches. The drum is then started rotating again, and the band spun the rest of the way onto the drum by the applier. It is important to rotate the band at relatively high speed at the beginning of the "spin on" operation in order to provide the "throw out" of the band as soon as possible so that the bands will not stick together causing wrinkling. Difficulties in spinning on bands are directly related to the tackiness of the band stock. On damp-humid days, for instance the bands will tend to stick together more than at other times, and special precaution must be taken to avoid wrinkling the bands. Sometimes a strip of cloth, called a "skid rag," is wrapped around the carcass on the building drum and the next band spun on over this to prevent the bands from sticking together. This, however, is time consuming because the skid rag has to be wrapped on the carcass and then has to be pulled out from between the bands as soon as the band is spun on. Zinc stearate, a common substance used in tire building for lubricating purposes, may be used in place of the skid rag in order to make the bands spin on more consistently. Under some conditions, however, neither the skid rag nor the use of zinc stearate is necessary because the bands are not tacky enough to require it.

While the band applier specifically illustrated in the accompanying drawings is suspended from the ceiling for convenience, it may of course be mounted on casters which roll on the floor or on tracks located in the floor instead of on the ceiling. The advantage of suspending the applier from the ceiling is that there are no tracks in the floor where they may become easily clogged with foreign matter and require frequent cleaning.

What is claimed is:

1. Apparatus for mounting endless bands of elastic material on a rotatable cylindrical drum of a tire building machine wherein one end of the drum is free, said apparatus comprising a frame movable adjacent to and away from the free end of the rotatable drum, a single band supporting and applying roller mounted on said frame for rotation about its own axis, the diameter of said roller being relatively large but less than half than the diameter of said tire building drum, said roller being positioned on said frame so that it is movable into adjacent end-to-end band-applying position relative to the free end of said drum, said roller being located in said band-applying position adjacent the periphery of said drum and with the periphery of said roller lying partially within and partially outside an imaginary extension of the cylindrical surface of said drum, whereby an endless band may be spun from said roller onto said drum.

2. Apparatus as defined in claim 1, wherein the axis of said roller is adjustably fixed at an angle to the axis of said drum.

3. Apparatus as defined in claim 2 wherein said frame is movable parallel to the axis of said rotatable drum so that said roller is movable endwise into said band-applying position.

4. Apparatus as defined in claim 3 wherein an elongated guide member is fixed to said frame and extends alongside of said band applying roller, said member being coextensive with the axis of said drum when said roller is moved into band-applying position with said drum, said drum being provided with cooperating guide means on its axis for engagement with said elongated guide member in order to fix said band applying roller laterally of said drum when said roller is in band-applying position.

References Cited in the file of this patent

UNITED STATES PATENTS

| | | |
|---|---|---|
| 2,517,889 | Kuffler | Aug. 8, 1950 |
| 2,521,143 | Benson | Sept. 5, 1950 |
| 2,822,025 | Hollis | Feb. 4, 1958 |
| 2,822,027 | Hollis | Feb. 4, 1958 |